United States Patent [19]

Mochida

[11] Patent Number: 4,485,694

[45] Date of Patent: Dec. 4, 1984

[54] ENGINE STARTER CIRCUIT FOR AUTOMOTIVE VEHICLE WITH AUTOMATIC TRANSMISSION

[75] Inventor: Haruo Mochida, Yokohama, Japan

[73] Assignee: Nissan Motor Company, Limited, Kanagawa, Japan

[21] Appl. No.: 316,778

[22] Filed: Oct. 30, 1981

[30] Foreign Application Priority Data

Jan. 16, 1981 [JP] Japan .................... 56-3753

[51] Int. Cl.³ .................... B60K 41/00; B60K 20/00; F02N 17/00
[52] U.S. Cl. .................... 74/850; 74/473 R; 123/179 K
[58] Field of Search ....... 123/179 K, 198 D, 179 GB; 74/850, 473 R

[56] References Cited

U.S. PATENT DOCUMENTS

| | | | |
|---|---|---|---|
| 2,934,054 | 4/1960 | Quinlan | 74/850 X |
| 3,521,612 | 8/1970 | Santi et al. | 74/850 X |
| 3,534,637 | 10/1970 | Tomlinson | 74/850 |
| 3,540,313 | 11/1970 | Maurice et al. | 123/179 K X |
| 3,608,285 | 9/1971 | Berk | 123/179 K |
| 3,689,775 | 9/1972 | Smith et al. | 123/179 K X |
| 3,808,914 | 5/1974 | Hauser | 123/179 K X |
| 4,033,311 | 7/1977 | Burson | 123/179 K |
| 4,051,915 | 10/1977 | Behrens | 74/473 R X |
| 4,223,657 | 9/1980 | Sato et al. | 123/179 K |
| 4,279,179 | 7/1981 | Marto | 74/850 |
| 4,295,540 | 10/1981 | Hildebrecht | 123/179 K X |
| 4,363,249 | 12/1982 | Stugart | 74/850 |

*Primary Examiner*—Allan D. Herrmann
*Assistant Examiner*—Stephen B. Andrews

[57] ABSTRACT

An engine starter circuit for an automotive vehicle provided with an automatic transmission such that an engine can be started only when the gear selector lever is in the park or neutral position, in particular, only when the gear selector lever is securely shifted into the park position. The engine starter circuit according to the present invention comprises a redundant park-position detection switch in addition to an engine-starter switch and an inhibitor switch including a park-position detection switch and a neutral-position detection switch, so that the pseudo-parking position caused by a mechanical play in a linkage mechanism can be reduced, with more reliable detection of the park position. The redundant park-position detection switch is a pin-actuated or a body-actuated selector microswitch positioned with respect to the gear selector lever of the automatic transmission and so constructed as to reduce the mechanical play inherent in the detection of park-position.

6 Claims, 6 Drawing Figures

ENGINE STARTER CIRCUIT FOR AUTOMOTIVE VEHICLE WITH AUTOMATIC TRANSMISSION

BACKGROUND OF THE INVENTION

1. Field of the Invention

The present invention relates to an engine starter circuit for an automotive vehicle provided with an automatic transmission, and more specifically to an engine starter circuit such that an engine can be started only when the gear selector lever has been securely shifted into the park position.

2. Description of the Prior Art

In an automotive vehicle provided with an automatic transmission, when a gear selector lever is shifted into any position of Park (P), Reverse (R), Neutral (N), Drive (D), Second (2), or First (1), the position of transmission gears is changed to drive or park the vehicle under an appropriate gear ratio. Therefore, in order to start the engine safely, it is necessary to start the engine after the driver confirms that the gear selector level has been shifted into either the park position (P) or the neutral position (N). If the engine is started when the selector lever is in any selector lever positions other than the park position (P) or the neutral position (N), the vehicle will move dangerously when the engine starts.

In order to securely start the engine only when the gear selector lever is shifted into the park position or neutral position, conventionally there is provided an inhibitor switch including a park-position detection switch turned on only when the gear selector lever is shifted into the park position and a neutral-position detection switch turned on only when the gear selector lever is shifted into the neutral position.

In a prior-art engine starter circuit, however, since the above-mentioned inhibitor switch is usually positioned with respect to a linkage mechanism so as to be usable in common with a control switch for actuating necessary hydraulic-pressure control valves for the torque converter and there inevitably exists mechanical play in the linkage mechanism used as the inhibitor-switch actuating mechanism, there will often be a pseudo-park or pseudo-neutral position in which the inhibitor switch is turned on even when the gear selector lever is not securely shifted into the park or neutral position, that is, when the gear selector lever is within a deviation angle range near the correct park or neutral position.

In order to reduce this angle range of the pseudo-park or pseudo-neutral position, it is possible to use a strong detent mechanism; however, when the switching force is increased for further reliable positioning of the selector lever, the gear selector lever becomes difficult to operate, that is, it is impossible to completely eliminate the deviation angle range of pseudo-park or pseudo-neutral position.

A more detailed description of the prior-art engine starter circuit for an automotive vehicle provided with an automatic transmission will be made hereinafter under DETAILED DESCRIPTION OF THE PREFERRED EMBODIMENTS with reference to the attached drawings.

SUMMARY OF THE INVENTION

With these problems in mind, it is the primary object of the present invention to provide an engine starter circuit for an automotive vehicle with an automatic transmission such that the engine can be started only when the gear selector lever has been securely shifted into the park position even when there exists mechanical play in the inhibitor switch actuating mechanism, that is, even when there exists a pseudo-parking position in the inhibitor switch used in common with a control switch for actuating the hydraulic-pressure control valves for the torque converter.

To achieve the above-mentioned object, the engine starter circuit according to the present invention comprises an additional, redundant park-position detection switch with less mechanical play connected in series with an engine starter switch and a park-position detection switch in order to permit engine start-up only when the gear selector lever is securely shifted into the park or neutral position. The redundant park-position detection switch with less mechanical play is a selector microswitch positioned with respect to the gear selector lever of the automatic transmission so as to be actuated thereby.

BRIEF DESCRIPTION OF THE DRAWINGS

The features and advantages of the engine starter circuit for an automotive vehicle provided with an automatic transmission according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

To facilitate understanding of the present invention, a brief reference will be made to a prior-art engine starter circuit for an automotive vehicle with an automatic transmission, with reference to FIGS. 1 and 2.

Figure 1:
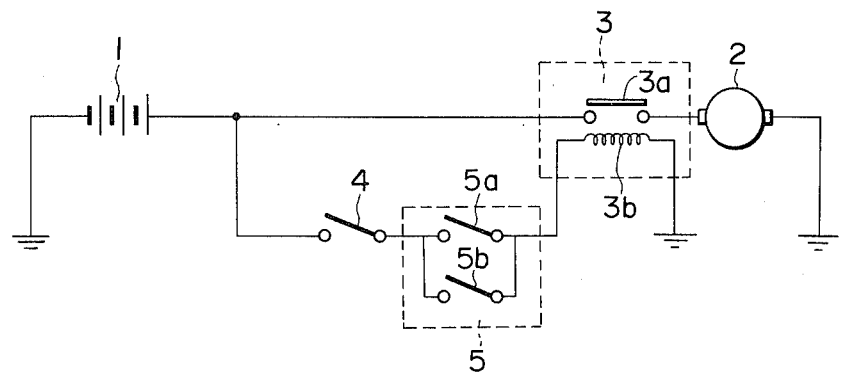
FIG. 1 is a schematic wiring diagram of a prior-art engine starter circuit for an automotive vehicle provided with an automatic transmission.

In FIG. 1, the reference numeral 1 denotes a battery, the numeral 2 denotes a starter motor, the numeral 3 denotes a starter relay connected between the battery 1 and the starter motor 2, and the numeral 4 denotes a starter switch. The numeral 5 denotes an inhibitor switch including a park-position detection switch 5a turned on only when the gear selector lever is shifted into Park position (P) and a neutral-position detection switch 5b turned on only when the gear selector lever is shifted into Neutral position (N).

In a prior-art engine starter circuit thus constructed, when the inhibitor switch 5 is kept turned on, that is, when the starter switch is turned on with the gear selector lever set to either of Park position (P) or Neutral position (N), the starter relay coil 3b of the starter relay 3 is energized to close a contact 3a, so that a current is passed through the starter motor 2 from the battery 1 to start the engine 2. Therefore, the engine can be started only when the gear selector lever is in Park position (P) or Neutral position (N).

Figure 2:
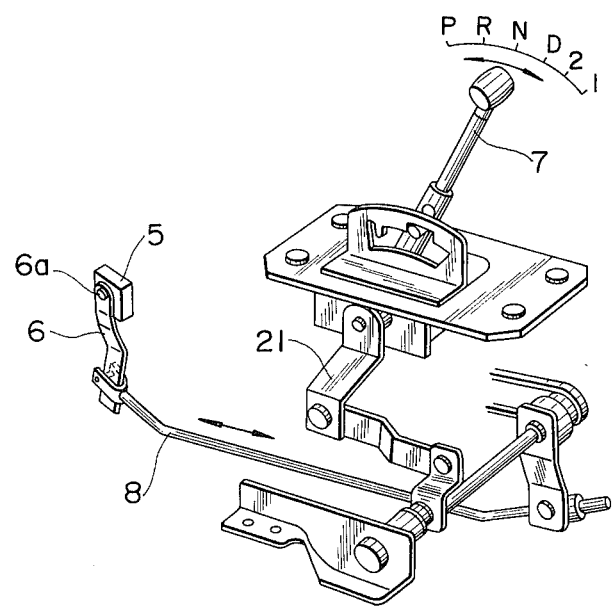
FIG. 2 is a perspective view of a prior-art linkage mechanism used for an automatic transmission.

FIG. 2 shows a linkage mechanism which shifts the gears of an automatic transmission in cooperation with the gear selector lever provided for an automotive vehicle with an automatic transmission. In this linkage mechanism, the inhibitor switch 5 is mounted near a pivotable pin 6a for a manual lever 6 of the linkage mechanism. The inhibitor switch 5 is turned on or off when the shift rod 8 is moved back and forth in conjunction with the movement of the gear selector lever 7, and is turned on only when the gear selector lever 7 is shifted into the park position or the neutral position.

In the linkage mechanism, however, since there will exists mechanical play between the manual lever 6 and the shift rod 8, the inhibitor switch 5 can be turned on when the selector lever 7 is shifted anywhere into a deviation angle range about Park position (P) or Neutral position (N). In other words, the inhibitor switch 5 is turned on even when the gear selector lever is not securely shifted into the park or neutral position, that is, even when the gear selector lever is within a deviation angle range separate from the correct park or neutral position.

The position where the inhibitor switch is turned on in such a way as described above is called a pseudo-park or pseudo-neutral position. In order to reduce the angle range of these pseudo positions, that is, in order to design the link mechanism so that the gear selector lever can securely be shifted into the respective shift positions, a detent mechanism (not shown) is usually used by providing an appropriate slot and an appropriately-sized ball urged against the slot by a spring therewithin so as to localize the relative positions of the above two members. The more the switching force applied therebetween, the more accurate the positioning of the gear selector lever, but the stiffer the movement of the gear selector lever. Accordingly, it is impossible to unconstrainedly increase the detent force, that is, to completely eliminate the above-mentioned angle range of pseudo-park or pseudo-neutral position.

In view of the above description, there is explained hereinbelow an embodiment of the engine starter circuit for an automotive vehicle provided with an automatic transmission according to the present invention with reference to FIGS. 3 to 5.

Figure 3:
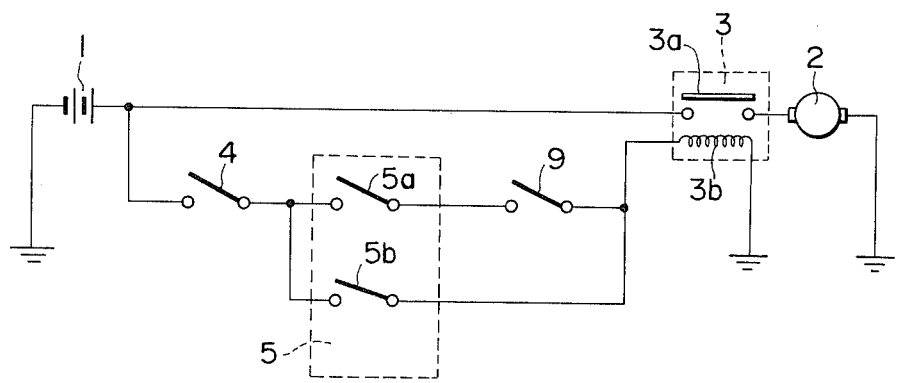
FIG. 3 is a schematic wiring diagram of a preferred embodiment of the engine starter circuit for an automotive vehicle provided with an automatic transmission according to the present invention.

In the embodiment of FIG. 3, a redundant park-position detection switch 9 with less mechanical play is additionally provided between a park position detection switch 5a in a inhibitor switch 5 used for a prior-art engine starter circuit and a starter relay coil 3b of a starter relay 3.

In this case, it is of course evident that the redundant park-position detection switch 9 must be a switch actuated by a mechanism having less mechanical play, that is, a smaller deviation angle range of pseudo-park position compared with the park-position detection switch 5a of the inhibitor switch 5.

Figure 4A:
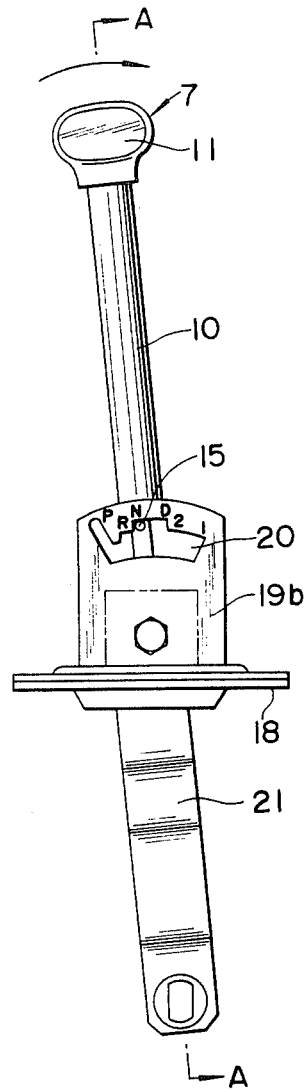
FIG. 4(A) is a side view of a gear selector lever employing a first embodiment of a redundant park-position detection switch used with the engine starter circuit according to the present invention.
Figure 4B:
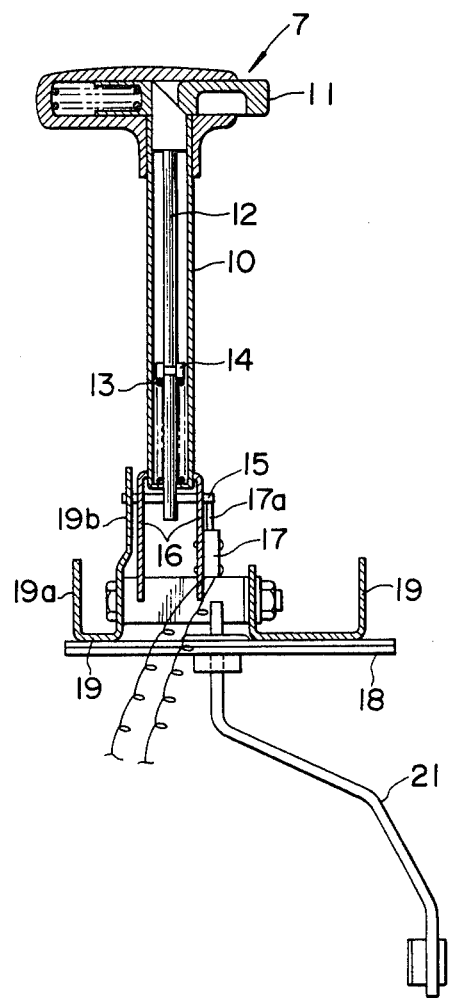
FIG. 4(B) is a front longitudinal-section view of the gear selector lever of FIG. 4(A), taken along the lines A—A.

FIGS. 4(A) and (B) show a first embodiment in which the redundant park position detection switch 9 with less mechanical play is a gear selector microswitch actuated by a vertically-mobile gear selector position pin. FIG. 4(A) shows a side view of a gear selector lever and FIG. 4(B) shows a axial sectional view thereof. In the figures, a plunger button 11 is provided on the upper portion of a selector body 10, and a rod 12 is housed within the selector body 10 so as to be movable up and down. The rod 12 is always urged upward by a spring 13 disposed between a stopper 14 fixed at an appropriate position of the rod 12 and the bottom of the selector body 10. At the lower end of the rod 12, a position pin 15 is attached perpendicular to the longitudinal direction of the rod 12. The position pin 15 actuates a microswitch 17 mounted on the side surface of one of a pair of a selector-lever supporting arms 16 when the position pin is lowered onto a switch arm 17a of the microswitch 17.

On the other hand, as depicted in FIG. 4(B), a support angle bracket 19 is fixed by, for instance, brazing to a bracket 18 attached to a car body. The outer vertical portion 19a of the support angle bracket 19 serves to mount an indicator (not shown) and the inner vertical portion 19b of the support angle bracket 19 serves as a position plate. In the position plate 19b, a cut-out 20 is formed. As is well depicted in FIG. 4(A), the shape of this cut-out 20 is formed most deeply in Park position (P), most shallowly in Reverse position (R), First and Second positions (1) and (2), and moderately in Neutral and Drive positions (N) and (D). The reference numeral 21 denotes an extension lever which functions as a part of a linkage mechanism which transmits the movement of the gear selector lever 7 to the manual lever 6 of FIG. 2.

To operate the selector lever 7, the plunger button 11 is pushed inward, so that the rod 12 is lowered against a force applied by the spring 13. As a result, since the position pin 15 is displaced from the upper surface of respective cut-out 20 in the position plate 19b, the gear selector lever 7 can freely move in either direction, and therefore it is possible to select any desired selector-lever positions.

When the selector lever 7 is shifted into any of the Reverse (R), Neutral (N), Drive (D), Second (2) and First (1) positions, since the upward movement of the position pin 15 is restricted by the shape of the cut-out 20, so that the switch arm 17a of the microswitch is depressed downward and the pin-actuated microswitch 17 is kept turned off. That is to say, when the selector lever 7 is in any position other than Park position (P), the pin-actuated microswitch which functions as the redundant park-detection switch 9 of FIG. 3 is kept turned off, so that power to the engine starter motor is cut off.

However, when the selector lever 7 is shifted into Park position (P), since the position pin is placed into the most deepest slot of the cut-out 20, the switch arm 17a of the pin-actuated microswitch 17 can move upward, that is, the switch arm is not depressed, so that the pin-actuated microswitch 17 is turned on. In other words, only when the gear selector lever 7 is shifted into Park position (P), the redundant park-position detection switch 9 of the engine starter circuit is turned on. Therefore, only in this case, it is possible to start the engine by turning on a starting switch 4.

Figure 5:
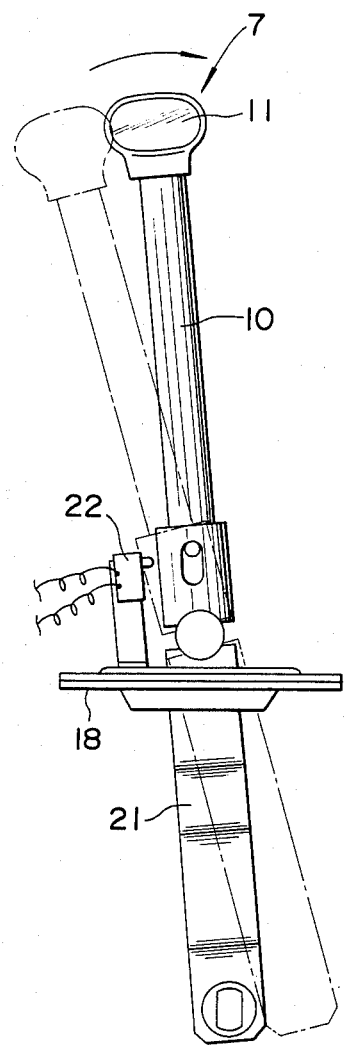
FIG. 5 is a side view of a gear selector lever employing a second embodiment of a redundant park-position detection switch used with the engine starter circuit according to the present invention.

FIG. 5 shows a second embodiment according to the present invention. In this embodiment, the redundant park-position detecting switch 9 with less mechanical play is actuated by the selector body 10, not by the position pin 15. In this figure, the support angle bracket 19 including the position plate 19b and the indicator mounting portion 19a of FIGS. 4(A) and (B) is not shown.

In more detail, only when the gear selector lever 7 is shifted into Park position (P) shown by dotted and dashed lines is a microswitch 22 fixed on the vertical portion of a bracket 18 turned on. Thus, it is possible to start the engine by turning on the starter switch 4 in the same manner as in the first embodiment.

In the above embodiment according to the present invention, two park-position detection switches are used; however, the park-position detection switch 5a is the one used for actuating necessary hydraulic-pressure control valves for the torque converter, and the redundant park-position detection switch 9 with less mechanical play is the one used for detecting the state where the gear selector lever is securely in the park position with less mechanical play in the gear selector lever.

In the above embodiments according to the present invention, only a redundant park-position detection switch is further provided therein, without providing another redundant neutral-position detection switch. This is because there will be no problem even if the engine is started with gear selector lever shifted into the neutral position, since the driver is usually depressing the brake pedal. In other words, there exists a problem only when the engine is started with the gear selector lever imperfectly shifted into the park position.

As described above, since the redundant park-position detection switch with less mechanical play is additionally provided in the starter circuit according to the present invention, in series with the inhibitor switch, the engine can be started only when the gear selector lever is securely shifted into the park position, and not started when the gear selector lever 7 is imperfectly shifted into the park position, that is, even when the park-position detection switch 5a of the inhibitor switch 5 is turned on when the gear selector lever is shifted to within the angle range corresponding to pseudo-park position, thus preventing unexpected movement of the vehicle.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. An engine starter circuit for an automotive vehicle with an automatic transmission including a shift lever, which comprises:
   (a) a starter switch;
   (b) an inhibitor switch including in parallel:
      (1) a park-position detection switch adapted to be closed when the automatic transmission is shifted into the part position;
      (2) a neutral-position detection switch adapted to be closed when the automatic transmission is shifted into the neutral position, said inhibitor switch being connected in series with said starter switch;
   (c) a redundant park-position detection switch for detecting directly the park position of the shift lever, said redundant park-position detection switch being actuated by the shift lever and being closed when the shift lever is shifted into the park position, said redundant park-position detection switch being connected in series with said starter switch and said park-position detection switch in said inhibitor switch; and
   (d) a starter motor for starting the engine, said starter motor being energized only in two cases which are when all of said starter switch, said park-position detection switch, and said redundant park position detection switch are closed and when both said starter switch and said neutral-position detection switch are closed.

2. An engine starter circuit for an automotive vehicle with an automatic transmission as set forth in claim 1, which further comprises a starter relay including:
   (a) a starter relay contact for closing a circuit for applying a starter current to said starter motor, said starter relay contact being connected in series with said starter motor; and
   (b) a starter relay coil for actuating said starter relay contact when energized by another current passed therethrough, said starter relay coil being energized in said two cases.

3. An engine starting circuit for an automotive vehicle with an automatic transmission as set forth in claim 1, wherein said redundant park-position detection switch is a pin-actuated selector microswitch positioned with respect to a gear selector lever of the automatic transmission in such a way that said pin-actuated microswitch is closed only when the gear selector lever is in the park position, said pin-actuated selector microswitch being actuated by a position pin disposed in the selector lever.

4. An engine starting circuit for an automotive vehicle with an automatic transmission as set forth in claim 1, wherein said redundant park-position detection switch is a body-actuated selector microswitch positioned with respect to the gear selector lever of the automatic transmission in such a way that said body-actuated selector microswitch being actuated by the gear selector lever body.

5. An engine starting circuit for an automotive vehicle with an automatic transmission as set forth in claim 1, wherein said inhibitor switch including said park-position detection switch and said neutral-position detection switch is positioned with respect to a linkage mechanism of the automatic transmission in such a way that said respective park- or neutral-position detection switch is closed only when the gear selector lever is in the park or neutral position respectively, said respective park- or neutral-position detection switch being actuated by a manual lever in the linkage mechanism.

6. An engine starting circuit for an automotive vehicle with an automatic transmission as set forth in claim 1, wherein said redundant park-position detection switch is a switch actuated by a mechanism having less mechanical play than said park-position detection switch of the inhibitor switch in order to reduce the angle range through which said park-position detection switch is actuated.

* * * * *